Aug. 25, 1964     S. R. WARNER     3,145,639
AUTOMOBILE VENTILATING SYSTEM
Filed Aug. 14, 1961
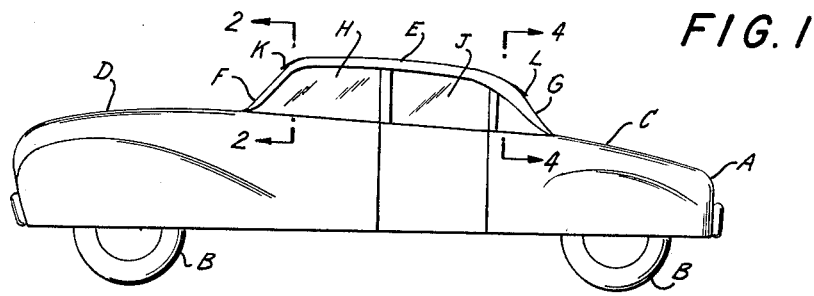
FIG. 1
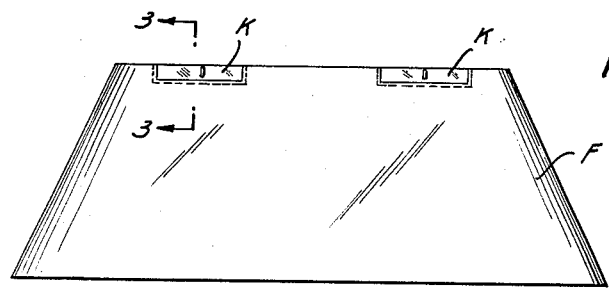
FIG. 2
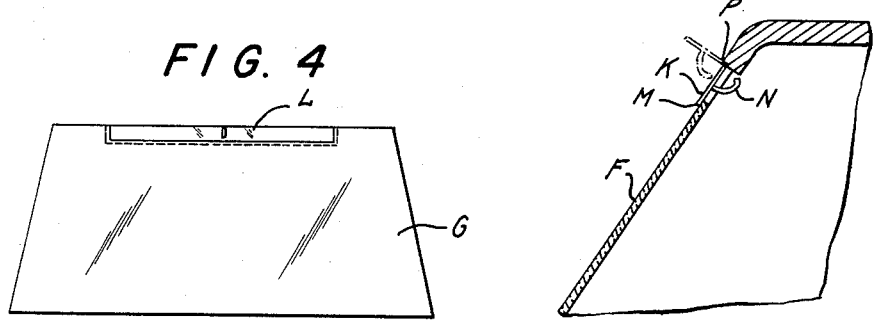
FIG. 4
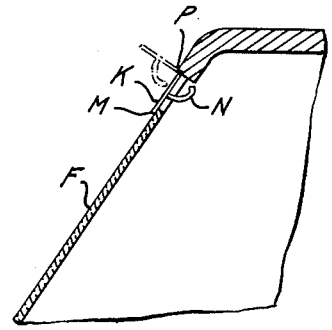
FIG. 3
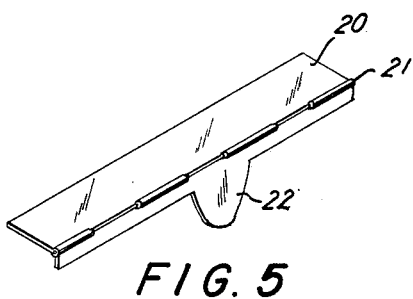
FIG. 5
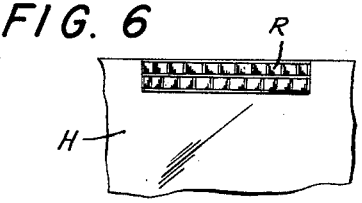
FIG. 6
INVENTOR.
SAMUEL R. WARNER
BY
ATTORNEY

United States Patent Office 3,145,639
Patented Aug. 25, 1964

3,145,639
AUTOMOBILE VENTILATING SYSTEM
Samuel R. Warner, 72—48 141st St., Flushing 67, N.Y.
Filed Aug. 14, 1961, Ser. No. 131,331
4 Claims. (Cl. 98—2)

The present invention relates to an automobile ventilating system.

When the rays of the sun on a hot day beat down on automobile windshields and rear windows, much heat is generated and built up inside the car. Hot air has no way to escape through the top of the car nor through the solid all glass windshield and rear window.

It is among the objects of the present invention to provide a simple system for ventilating the interior passenger space of an automobile without complicated body constructions and without requiring a series of vents and shutters which require considerable metal work in front of the dashboard and under the hood.

Another object is to provide a novel ventilating system for an automotive vehicle which will give adequate ventilation to seep out the hot vapors and air which accumulates in the interior of the car, and which will not require any changes whatsoever in the metal body structure.

A still further object is to provide a ventilating system which is to be effective not in the lower part of the car which primarily serves to blow up the pants and dresses, but in the interior upper part of the car where heated and stagnant air accumulates which creates maximum discomfort.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide narrow laterally elongated openings or vents approximately one inch in width and about 6 to 18 inches in length in the upper part of the windshield and rear window of an automotive vehicle desirably above the head of the passengers, which will be so arranged in the front and back of the upper part of the windshield and rear window as to direct a stream of air across the upper part of the interior of the car and act as an effective escape for the heated air.

This stream of air may be deflected or diffused so that it will draw with it the heated and stagnant air at the top of the interior of the automotive vehicle.

This all may be done without creating a draft over or above or upon the head of the rider in the vehicle and without causing any great draft either as to the front seat riders or the rear seat riders.

In effect, it operates through the device of openings, vents or slots forming an integral design of the windshield or rear window, which to date have been made as a solid sheet of glass, without any openings, vents or slots.

In a preferred form of the invention, there are narrow parallel slotted passageways extending across the longitudinal axis of the car and desirably passageways are vaned so as to admit and remove a criss cross thin narrow laterally widened stream of air in a highly disturbed and agitated state so that there will be maximum turbulence and a creation of a vacuum at the top of the interior of the automotive vehicle.

Desirably these elongated slots are positioned under the projecting forward and rear portions at the top of the front windshield and back window so that there will be an equal area for inflow and about 125% to 175% of this area for outflow in the rear window of the vehicle.

The extra area is provided by increasing the width of the slots and not by increasing the thickness of the parallel or multiple openings so that although the width of the stream will change from entrance to exit, the thickness of the stream will be about the same throughout its passage through the length of the car.

Desirably these inlet and outlet slots are axially aligned but there may be two lateral separated outlet slots with a single central inlet slot.

Desirably in the slots there are a series of oblique vanes with the inclination alternating first in one direction and then in a different direction so as to give the desired scissors cut to the diffusing and turbulent thin narrow ribbons of incoming air.

With the foregoing and other objects in view, the invention consists of the novel construction, combination and arrangement of parts as hereinafter will be more specifically described and illustrated in the accompanying drawing wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side elevational view of the automobile windshield to which the present ventilating system may be applied.

FIG. 2 is an inside elevational view of the windshield from the rear from the line 2—2 of FIG. 1 upon an enlarged scale as compared to FIG. 1.

FIG. 3 is a transverse fragmentary sectional view upon the line 3—3 of FIG. 2 showing the pivoted shutter arranged upon enlarged scale as compared to FIG. 2.

FIG. 4 is an inside elevational view of the laterally slotted arrangement of the rear window opening taken from the line 4—4 of FIG. 1 and upon enlarged scale as compared to FIG. 1.

FIG. 5 is a top perspective view of the swinging shutter arrangement that may be applied to the slotted arrangement of FIGS. 2, 3 and 4 upon enlarged scale as compared to FIGS. 1 to 4.

FIG. 6 is a fragmentary elevational view showing a louvred outlet arrangement with oppositely directed diffusing vanes which may be used at the upper top portions of the side windows.

Referring to FIGS. 1 to 3 there is shown an automotive vehicle A having wheels B, a rear trunk compartment C, a front hood D and a top E with the front windshield F and the rear window G.

The side windows H and J may also be slotted and provided with oppositely directed diffusing vanes as diagrammatically indicated at R in the side window H in FIG. 6 so as to permit diverse lateral streams of air but generally only the front and rear windows are so slotted.

Referring to the inside view of the front windshield F and the inside view of the rear window G, there are shown in the front window two narrow slotted members while there is a single opening L in the rear window G.

It is obvious of course that the slots may be aligned both forwardly and rearwardly or that they may be separated on the rear window G as well as the windshield F.

It is further obvious that both slots K and L may be single with the rear slot L being desirably longer but not wider than the forward slots. These slots are protected from the rain and they may have side drains so as to catch any wetness before it enters the body of the car with a channel extending the full width of the bottom of the slots, which channel is inclined downwardly toward one side or both sides so as to discharge any water picked up by the slots down over the exterior of the windshield F or the rear window G.

Desirably these slots K and L have two or even three or four superimposed narrow ribbon-like passageways with alternately oppositely directed oblique vanes as indicated at R in FIG. 6 to permit ready outflow of the hot and stagnant air out of the vehicle enclosure.

In FIG. 3 is shown a swinging member M with a handle N on a hinge P. This may be operated to open or close the slot K depending upon whether ventilation is desired or not. A similar device may be associated with a rear window G.

The swinging alternative shutter structure shown in FIG. 5 has a forwardly extending closure member 20, a hinge structure 21 and a handle portion 22. This may be used in connection with the forward and rear slotted openings.

The vents or openings may be approximately one inch in width and about 6 to 18 inches in length depending upon the desires of the vehicle building and the volume to be conditioned with ventilated air.

The vents or openings assure effective automobile ventilation. The fresh air will come in through the vents or openings in the top of the windshield and continue out through the vent or opening in the top of the rear window, for complete ventilation. Since the air is drawn in near the top of the car it is most free of road dust, and there is provided an inexpensive and effective ventilating arrangement while the car is in motion.

The outside or exterior hinged slat of metal, plastic, glass, fabric or any suitable material, attached to a handle and controlled from inside the car or vehicle, will make an efficient weathertight cover over the vents or openings, at the discretion of the occupants of the vehicle, particularly during cold or wet weather.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A ventilating hot air escapement system for an automotive vehicle of the type having a closed body with a windshield and side and rear windows, said system having forward and rearward laterally widened slots extending across and forming laterally elongated narrow recesses in the upper edges of the windshield and the rear window adjacent the top thereof to assure a through stream of ventilating air, there being two separated front slots at the sides of the windshield and a central slot in the central portion of the rear window so that the stream of ventilating air will enter at the sides of the windshield and exit at the central portion of the rear window and said windshield being in an inclined plane extending upwardly and rearwardly and said rear window being in an inclined plane extending upwardly and forwardly and said slots respectively being positioned in said inclined planes.

2. A ventilating system hot air escapement for an automotive vehicle of the type having a closed body with a windshield and side and rear windows, said system having forward and rearward laterally widened slots extending across and forming laterally elongated narrow recesses in the upper edges of the windshield and the rear window adjacent the top thereof to assure a through stream of ventilating air, said slots being provided with swinging covers, there being two separated front slots at the sides of the windshield and a central slot in the central portion of the rear window so that the stream of ventilating air will enter at the sides of the windshield and exit at the central portion of the rear window and said windshield being in an inclined plane extending upwardly and rearwardly and said rear window being in an inclined plane extending upwardly and forwardly and said slots respectively being positioned in said inclined planes.

3. A ventilating system hot air escapement for an automotive vehicle of the type having a closed body with a windshield and side and rear windows, said system having forward and rearward laterally widened slots extending across and forming laterally elongated narrow recesses in the upper edges of the windshield and the rear window adjacent the top thereof to assure a through stream of ventilating air confined to the interior of the top of the body, said slot being wider and having a greater area in the rear than in the front although being of the same thickness, there being two separated front slots at the sides of the windshield and a central slot in the central portion of the rear window so that the stream of ventilating air will enter at the sides of the windshield and exit at the central portion of the rear window and said windshield being in an inclined plane extending upwardly and rearwardly and said rear window being in an inclined plane extending upwardly and forwardly and said slots respectively being positioned in said inclined planes.

4. A ventilating hot air escapement system for an automotive vehicle of the type having a closed body with a windshield and side and rear windows, said system having forward and rearward laterally widened slots extending across and forming laterally elongated narrow recesses in the upper edges of the windshield and the rear window adjacent the top thereof to assure a through stream of ventilating air, said slots being multiple and having oppositely directed diffusing vanes, there being two separated front slots at the sides of the windshield and a central slot in the central portion of the rear window so that the stream of ventilating air will enter at the sides of the windshield and exit at the central portion of the rear window and said windshield being in an inclined plane extending upwardly and rearwardly and said rear window being in an inclined plane extending upwardly and forwardly and said slots respectively being positioned in said inclined planes.

References Cited in the file of this patent

UNITED STATES PATENTS

| | | |
|---|---|---|
| 1,435,490 | Mitchell | Nov. 14, 1922 |
| 1,560,585 | Klingberg | Nov. 10, 1925 |
| 1,626,893 | Twyman et al. | May 3, 1927 |
| 2,045,578 | Buford | June 30, 1936 |

FOREIGN PATENTS

| | | |
|---|---|---|
| 367,064 | Great Britain | Feb. 18, 1932 |
| 780,719 | France | May 2, 1935 |